United States Patent [19]

Hachisuga

[11] Patent Number: 5,619,363
[45] Date of Patent: Apr. 8, 1997

[54] LASER OPTICAL SYSTEM

[75] Inventor: Masaki Hachisuga, Saitama, Japan

[73] Assignee: Fuji Xerox Co., Ltd., Tokyo, Japan

[21] Appl. No.: 322,534

[22] Filed: Oct. 13, 1994

[30] Foreign Application Priority Data

Dec. 28, 1993 [JP] Japan .................................. 5-337458

[51] Int. Cl.$^6$ .................................................. G02B 26/08
[52] U.S. Cl. ...................... 359/216; 359/206; 359/217; 359/218; 359/219
[58] Field of Search .................... 359/205–206, 359/216–219, 197, 850, 855, 871–872; 346/108, 160; 347/231, 261

[56] References Cited

U.S. PATENT DOCUMENTS

| | | |
|---|---|---|
| 3,944,323 | 3/1976 | Starkweather . |
| 4,121,883 | 10/1978 | Goshima et al. .................... 359/219 |
| 4,143,403 | 3/1979 | Ohnishi .............................. 358/206 |
| 4,274,703 | 6/1981 | Fisli ................................... 359/218 |
| 4,770,517 | 9/1988 | Sakuma ............................. 359/206 |

FOREIGN PATENT DOCUMENTS

| | | |
|---|---|---|
| 0424786A3 | 5/1991 | European Pat. Off. . |
| 4-253021 | 9/1992 | Japan . |
| 5-257077 | 10/1993 | Japan ................................. 359/218 |
| 2267763 | 12/1993 | United Kingdom ............... 359/218 |

*Primary Examiner*—James Phan
*Attorney, Agent, or Firm*—Finnegan, Henderson, Farabow, Garrett & Dunner, L.L.P.

[57] ABSTRACT

A laser optical system for scanning a laser beam using a rotary polygonal mirror made of plastics. In the laser optical system, a portion close to the edge on the side along the rotary direction of the mirror surface of the rotary polygonal mirror made of plastics is not used as an effective reflecting surface since the accuracy of this portion is difficult to be stabilized because of the problems caused in the process of molding. Due to the foregoing, a laser beam is always reflected on the effective reflecting surface close to the center of the rotary polygonal mirror, the accuracy of which is high. Therefore, it is possible to reduce the unevenness of writing in the laser optical system.

3 Claims, 5 Drawing Sheets

LASER OPTICAL SYSTEM

BACKGROUND OF THE INVENTION

1. Field of the Invention

The present invention relates to a laser optical system for scanning a laser beam using a rotary polygonal mirror made of plastics.

2. Description of the Related Art

Highly accurate smoothness and dimensional accuracy of a surface are required for a rotary polygonal mirror used for the laser beam optical scanning system. In general, rotary polygonal mirrors are manufactured by cutting aluminum materials. However, in order to reduce a load imposed on the motor by the weight and also to reduce the material cost, every effort is made in the design of rotary polygonal mirrors, that is, the rotary polygonal mirror is designed so that an effective reflecting surface of the rotary polygonal mirror on which a laser beam is irradiated corresponding to an effective scanning region on a surface of the image forming apparatus can be the same as the width in the rotary direction of the mirror surface.

However, it is difficult to machine aluminum materials accurately. Therefore, cost reduction can not be accomplished at present.

For this reason, it is recently attempted to manufacture a rotary polygonal mirror by molding plastics, however, a sufficient mirror surface accuracy can not be accomplished by the rotary polygonal mirror manufactured by means of molding plastics. Specifically, air in a metallic mold and gas generated from molten resin tend to stay at corners in the metallic mold, and there is a tendency that the surface accuracy at an end of the mirror surface is lowered.

Accordingly, when the rotary polygonal mirror made of aluminum is simply replaced with the rotary polygonal mirror made of plastic material in the laser optical system, unevenness is disadvantageously increased in the writing operation.

SUMMARY OF THE INVENTION

Giving consideration to the above facts, it is an object of the present invention to provide a laser optical system capable of reducing the unevenness of writing caused in the process of writing an image using a rotary polygonal mirror made of plastic material.

To achieve the above object, the present invention provides a laser optical system including a rotary polygonal mirror made of plastic material, wherein a portion of the rotary o polygonal mirror except for a portion close to an end of a mirror surface in a rotary direction is made to be an effective reflecting surface.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENT

Figure 2:
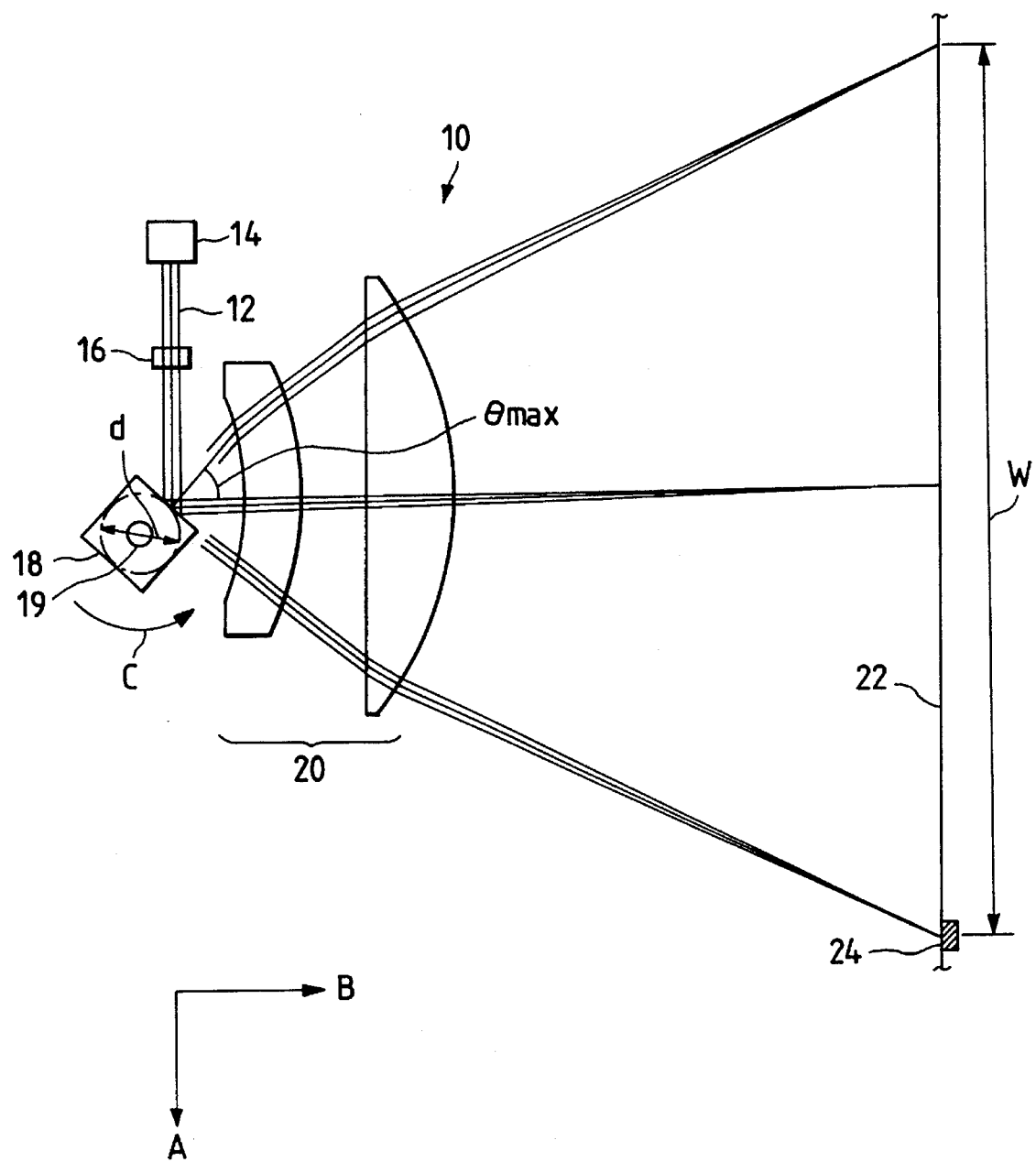
FIG. 2 is an overall arrangement view of the laser optical system.
Figure 4A:
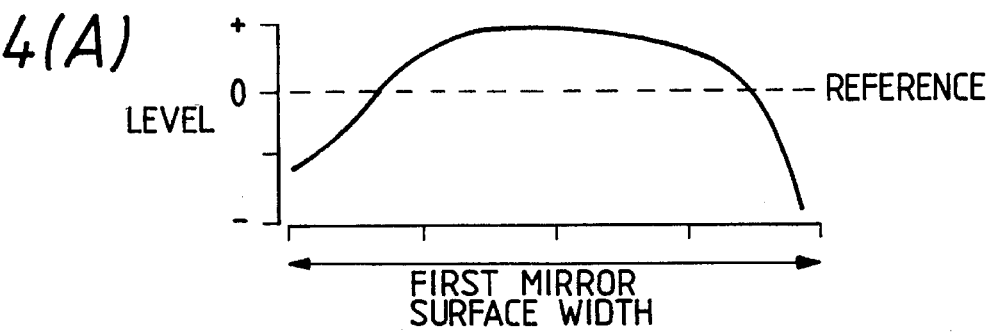
FIG. 4(A) is a graph showing the surface accuracy in a portion on the line A—A in FIG. 3 on a first mirror surface.
Figure 4B:
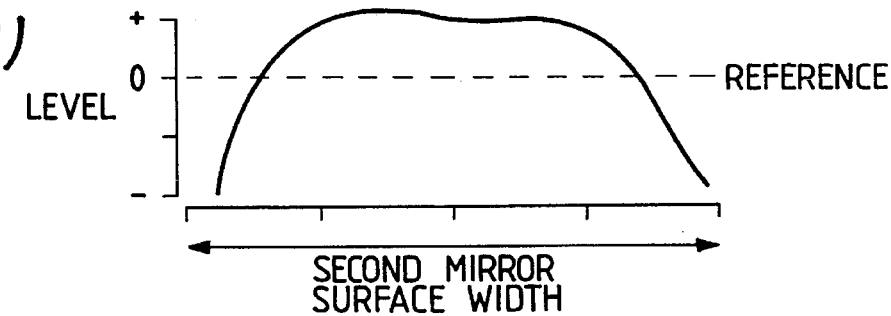
FIG. 4(B) is a graph showing the surface accuracy in a portion on the line A—A in FIG. 3 on a second mirror surface.
Figure 4C:
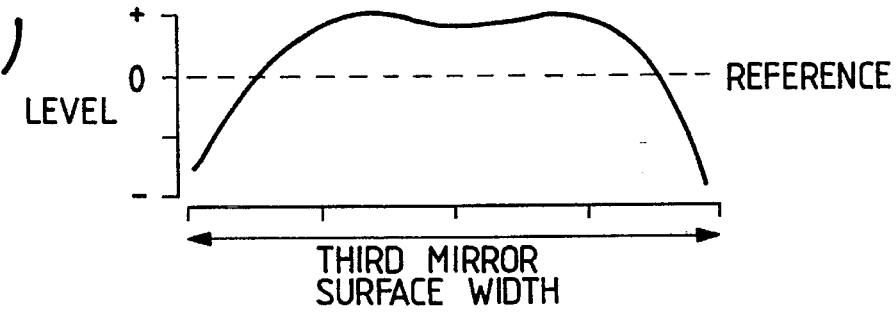
FIG. 4(C) is a graph showing %he surface accuracy in a portion on the line A—A in FIG. 3 on a third mirror surface.
Figure 4D:
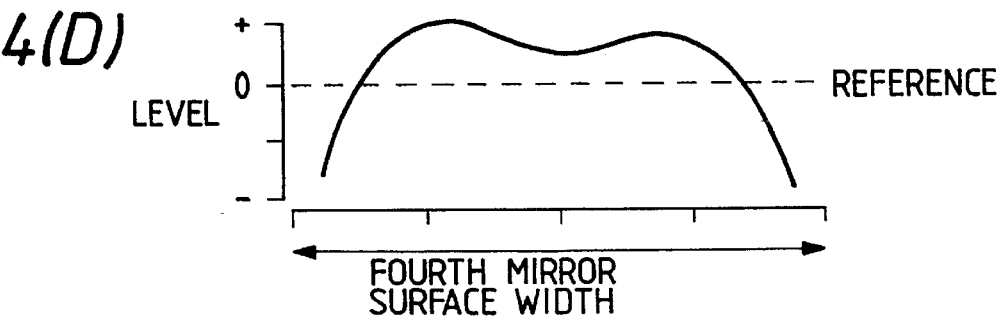
FIG. 4(D) is a graph showing the surface accuracy in a portion on the line A—A in FIG. 3 on a fourth mirror surface.

FIG. 2 is a view showing an overall construction of a laser optical system 10 according to an embodiment of the invention.

As shown in FIG. 2, the laser optical system 10 includes a laser beam generator 14 for irradiating a laser beam 12. A rotary polygonal mirror 18 is disposed on the laser beam irradiating side (in the direction of arrow A) of the laser beam generator 14 through a linear image formation optical system 16. A scanning surface 22 is disposed in a direction (in the direction of arrow B) perpendicular to the laser beam generator side through an f-θ lens 20 with respect to the rotary polygonal mirror 18.

The rotary polygonal mirror 18 is provided with a rotary shaft 19 making a right angle with the surface of FIG. 2, so that a square is formed in the direction perpendicular to the rotary shaft 19. This rotary polygonal mirror 18 is made of plastics. The rotary polygonal mirror 18 is rotated counterclockwise (in the direction of arrow C), so that the laser beam 12 conducts scanning operation from a lower position to an upper position on the surface of the drawing. A light receiving device 24 to time the start of image writing is disposed at a position on the lower side of the scanning surface 22 shown in FIG. 2.

A procedure for finding unevenness of image writing will be explained with reference to FIG. 1 and FIGS. 3 to 6.

Figure 1:
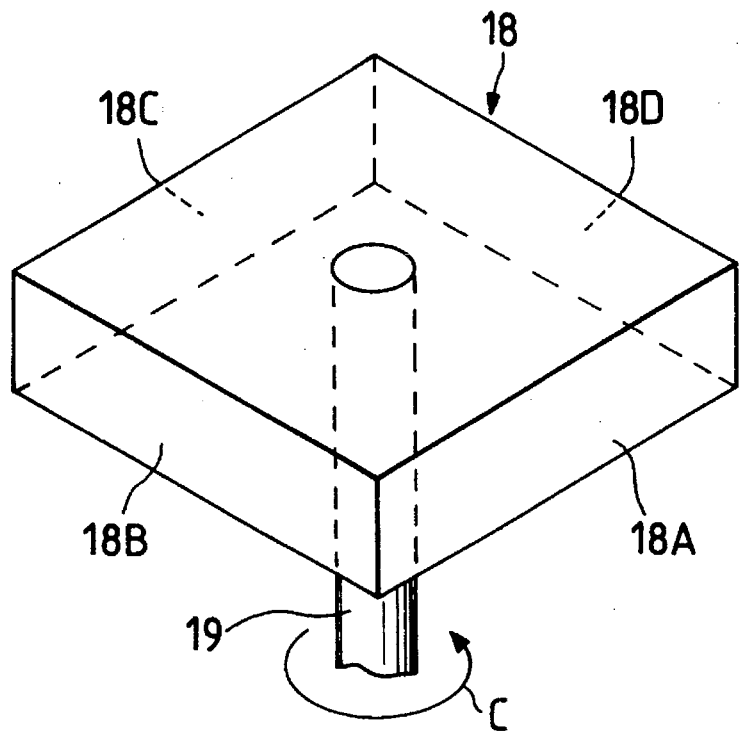
FIG. 1 is a perspective view of a rotary polygonal mirror used for a laser optical system according to an embodiment of the present invention.
Figure 3:
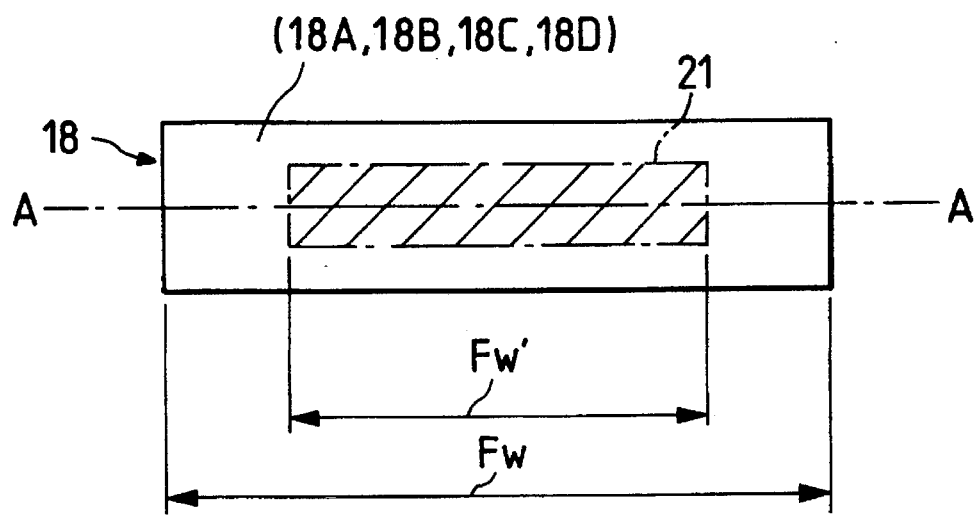
FIG. 3 is a side view of the rotary polygonal mirror.

FIGS. 4(A) to 4(D) are views showing the surface accuracy at beam irradiating positions (a portion of line A—A in FIG. 3) on the surfaces of a first mirror surface 18A to a fourth mirror surface 18D of the rotary polygonal mirror 18 shown in FIG. 1.

Figure 5A:
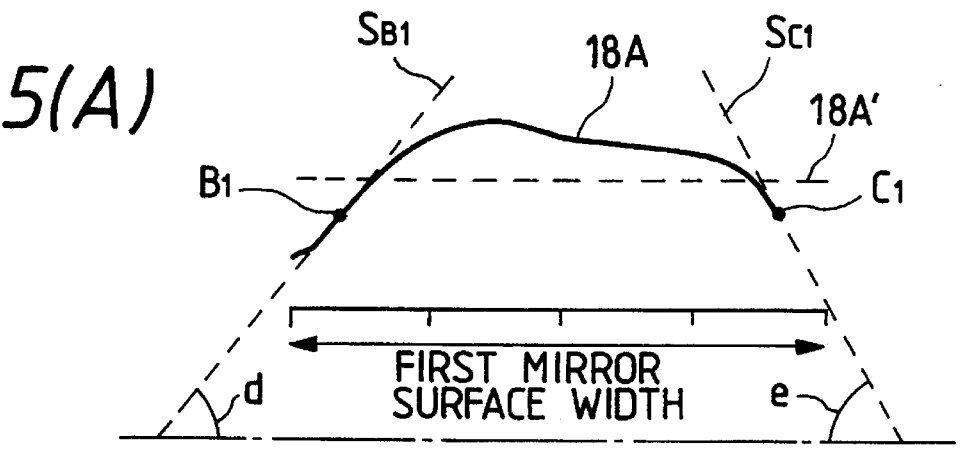
FIG. 5(A) is a schematic illustration showing an angle between the ideal mirror surface and the actual mirror surface at the start point and the end point of writing on the first mirror surface.
Figure 5B:
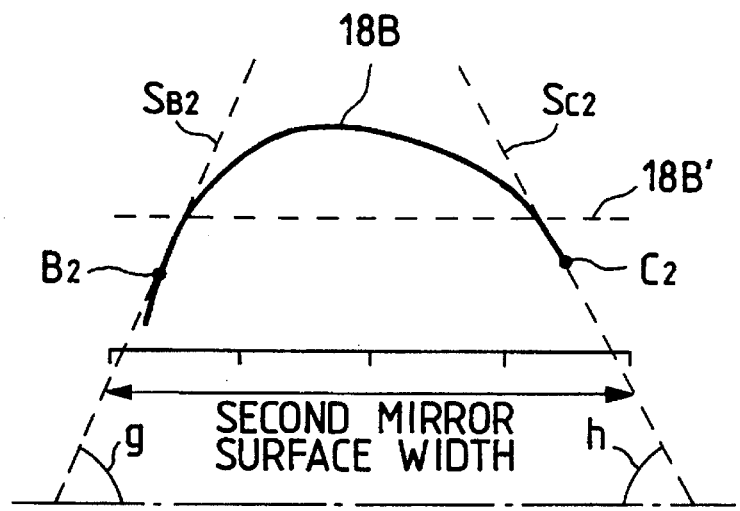
FIG. 5(B) is a schematic illustration showing an angle between the ideal mirror surface and the actual mirror surface at the start point and the end point of writing on the second mirror surface.

In FIG. 5(A), there are shown a reflecting position point $B_1$ on the first mirror surface 18A of the laser beam 12 directed to the light receiving device 24 to time the start of image writing, and an image writing end position point $C_1$. In FIG. 5(B), there are also shown a reflecting position point $B_2$ on the second mirror surface 18B of the laser beam 12 directed to the light receiving device 24, and an image writing end position point $C_2$.

As shown in FIG. 5(A), an angle formed between an ideal mirror surface 18A' of the first mirror surface 18A and a tangent $S_{B1}$ of the first mirror surface 18A passing through the point $B_1$ is defined as $\underline{d}$ (rad). An angle formed between the ideal mirror surface 18A' of the first mirror surface 18A and a tangent $S_{C1}$ of the first mirror surface 18A passing through the point $C_1$ is defined as $\underline{e}$ (rad). As shown in FIG. 5(B), an angle formed between an ideal mirror surface 18B' of the second mirror surface 18B and a tangent $S_{B2}$ of the second mirror surface 18B passing through the point $B_2$ is defined as g (rad). An angle formed between the ideal mirror surface 18B' of the second mirror surface 18B and a tangent $S_{C2}$ of the second mirror surface 18B passing through the point $C_2$ is defined as $\underline{h}$ (rad). Then, a slippage angle between the laser beam 12 reflected on the first mirror surface 18A and that reflected on the second mirror surface 18B can be expressed by 2(d+e)+2(g+h).

Figure 6:
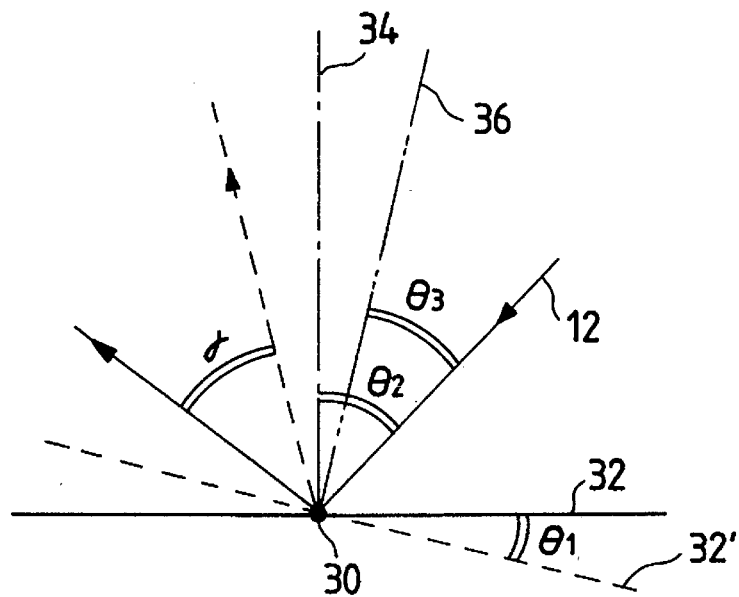
FIG. 6 is a schematic illustration for explaining a change in the reflecting angle of the laser beam in the case where the mirror surface is inclined.

For example, as shown in FIG. 6, the following are defined. Numeral 30 is a point on an ideal mirror surface 32 on which the laser beam 12 is incident. Numeral 34 is a perpendicular provided on the ideal mirror surface 32, the perpendicular passing through the point 30. Numeral 36 is a perpendicular provided at the point 30 on a mirror surface 32 inclined with respect to the ideal mirror surface 32 by an angle $\theta_1$ (rad). Character $\theta_2$ is an angle (rad) formed between the incident leaser beam 12 and the perpendicular 34. Character $\theta_3$ is an angle (rad) formed between the incident leaser beam 12 and the perpendicular 36. Character $\gamma$ is an angle formed between the laser beam 12 reflected on the ideal mirror surface 32 and the laser beam 12 reflected on the mirror surface 32' inclined by the angle $\theta_1$. Then, the following expressions are established.

$$\begin{aligned}\gamma &= 2\theta_2 - 2\theta_3\\ &= 2\theta_2 - 2(\theta_2 - \theta_1)\\ &= 2\theta_1\end{aligned}$$

Accordingly, when the mirror surface 32 is inclined by the angle $\theta_1$, the reflected laser beam 12 is changed by the angle $2\theta_1$.

Therefore, when the laser beam 12 is scanned by the first mirror surface 18A, an angle of slippage of the reflected laser beam 12 is twice as large as the angle (d+e). When the laser beam 12 is scanned by the second mirror surface 18B, an angle of slippage of the reflected laser beam 12 is twice as large as the angle (g+h). Consequently, an angle of slippage between the laser beam 12 reflected on the first mirror surface 18A and the laser beam 12 reflected on the second mirror surface 18B is expressed by 2(d+e)+2(g+h).

Next, when a focal distance of the f-θ lens 20 is f (mm), a writing slippage between the first mirror surface 18A and the second mirror surface 18B is expressed by |f×{2(d+e)= 2(g+h)}| (mm).

In this connection, characters are defined as follows. A diameter of the laser beam 12 on the scanning surface 22 is $\omega_0$ (μm); a wavelength of the laser beam 12 is λ (nm); and a focal distance of the f-θ lens 20 is f (mm). Then, a diameter ω (mm) of the laser beam 12 on the rotary polygonal mirror 18 is expressed by the following expression (1).

$$\omega_1 = 4 \cdot f \cdot \lambda / (\pi \cdot \omega_0 \times 10^{-3}) \tag{1}$$

Next, consideration is given to an effective scanning efficiency $D_F$ (%), wherein the effective scanning efficiency $D_F$ is defined as a ratio of the width of the region in which an image is substantially formed with respect to the width W of the effective scanning region of the laser beam on the scanning surface. In the case where the laser beam 12 is incident on the rotary polygonal mirror 18 in the manner of front incidence in which the laser beam 12 coincides with the optical axis, a surface size $F_{W0}$ (mm), which is a size in the rotary direction, of the laser beam 12 on the rotary polygonal mirror 18 can be expressed by the following expression (2).

$$F_{W0} = \frac{0.4 \cdot f \cdot \lambda}{(100 - D_F) \cdot \pi \cdot \omega_0} \tag{2}$$

However, the surface size $F_{W0}$ expressed by the above expression (2) is applied to a case of the front incidence. In an actual optical system, the incidence of the laser beam 12 on the rotary polygonal mirror 18 is not limited to the front incidence. Further, the actual surface size is greatly changed in accordance with an angle formed between the laser beam 12 incident on the rotary polygonal mirror 18 and the optical axis, and also in accordance with a rotary center position of the rotary polygonal mirror 18.

Here, consideration is given to an imaginary rotary polygonal mirror, the overall mirror surface of which is highly accurate. When this imaginary rotary polygonal mirror is rotated, a laser beam irradiated on the mirror surface is moved in the rotary direction. When a distance of this movement is denoted by L, it is expressed by the following expression (3).

$$L = d \cdot \tan\frac{\theta_{max}}{2} \tag{3}$$

In the above expression, character d is a diameter of an inscribed circle of the imaginary rotary polygonal mirror, the overall mirror surface of which is highly accurate, and $\theta_{max}$ (rad) is a maximum scanning half angle (shown in FIG. 2).

Figure 7:
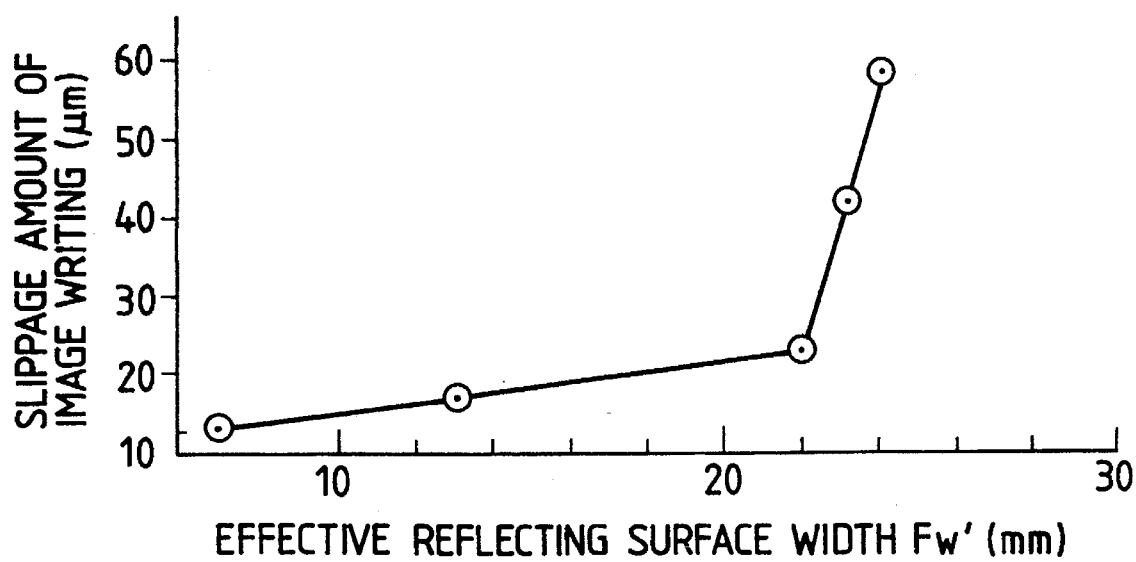
FIG. 7 is a graph showing a relation between the unevenness of image writing and the width of the effective reflecting surface of the rotary polygonal mirror.

FIG. 7 is a graph made under the following conditions: A plurality of rotary polygonal mirrors made of plastics, the width of the mirror surface of which was 28 mm, were manufactured as experiment. The horizontal axis of the graph expresses a width $F_w$" (mm) in the rotary direction of the effective reflecting surface 21, and the vertical axis expresses an amount of writing slippage computed from measurement values of the mirror surface accuracy. In this graph, the number of samples is seven (n=7) on the average.

According to the results shown in FIG. 7, the following can be understood:

In the case where the rotary polygonal mirror is made of plastics, one end portion of the mirror surface in the rotary direction of the mirror, the width of which is 3 mm, can not be used, that is, both end portions, the width of which is 6 mm, can not be used because of the low accuracy of the mirror surface. These values are approximately constant irrespective of the dimensions of the rotary polygoral mirror 18.

Therefore, the surface size $F_w$ of the rotary polygonal mirror 18 made of plastics in the rotary direction is finally expressed by the following expression (4) while consideration is given to a size α(=6 mm) of the portion of which the surface accuracy is low, and also given to a surplus coefficient β(1<β<2) in the design.

$$F_W > \left\{ \frac{0.4 \cdot f \cdot \lambda}{(100 - D_F) \cdot \pi \cdot \omega_0} + d \cdot \tan\frac{\theta_{max}}{2} \right\} \times \beta + \alpha \tag{4}$$

In this connection, the surface size of the rotary polygonal mirror made of plastics can be found by bore expression (4) even when the profile is hexagonal or octagonal.

In this embodiment, the diameter $\omega_0$ of the laser beam 12 scanned on the scanning surface 22 is 80 μm, the wavelength $\lambda$ of the laser beam 12 is 780 μnm, the focal distance f of the f-θ lens 20 is 143.3 mm, the effective scanning efficiency $D_F$ is 48%, and the maximum scanning half angle $\theta_{max}$ is 43.2°. The diameter d of a circle inscribed in the imaginary rotary polygonal mirror, the entire mirror surface of which is highly accurate, is 22 mm, the surplus factor $\beta$ is 1.8, and the surface size of the rotary polygonal mirror 18 in the rotary direction is 28 mm.

Next, the operation of this embodiment will be explained.

The laser beam 12 irradiated by the laser beam generator 14 is made to be parallel through the linear image forming optical system 16. Then, the laser beam 12 is reflected on the rotary polygonal mirror 18 rotated counterclockwise and passes through the f-θ lens 20. Then, the laser beam 12 conducts scanning on the scanning surface 22. In this connection, image writing on the scanning surface starts after a predetermined period of time has passed from the reception of the laser beam 12 by the light receiving device 24.

As described above, in this embodiment, the diameter of the laser beam 12 scanned on the scanning surface 22 is 80 μm, the wavelength of the laser beam 12 is 780 μnm, the focal distance of the f-θ lens 20 is 143.3 mm, the effective scanning efficiency is 48%, the maximum scanning half angle is 43.2° (0.24πrad), the diameter of a circle inscribed in the imaginary rotary polygonal mirror, the entire mirror surface of which is highly accurate, is 22 mm, and the surplus factor is 1.8. These values are substituted in the expression (4) to find the surface size.

Computation to find the surface size $F_w$ is made by the following expression (5).

$$F_W > \left\{ \frac{0.4 \times 143.3 \times 780}{(100-48) \times \pi \times 80} + 22 \times \tan\frac{0.24\pi}{2} \right\} \times 1.8 + 6 \quad (5)$$

$$F_W > 27.84 \text{(mm)}$$

In the laser optical system 10 of this embodiment, the actual surface size of the mirror surface of the rotary polygonal mirror 18 in the rotary direction is a little larger than the optimum surface size 27.84 mm obtained by the above computation. In other words, according to this embodiment, images can be written while the size of the rotary polygonal mirror made of plastics is minimized and unevenness of writing is reduced.

In the laser optical system as described above, a portion close to the side end in the direction of the rotary shaft in which the accuracy of the mirror surface of the rotary polygonal mirror is unstable is not used as an effective reflecting surface. Therefore, unevenness of writing can be reduced.

Also, in the laser optical system as described above, the size of the mirror surface of the rotary polygonal mirror made of plastics in the rotary direction is determined so that the expression (4) can be satisfied. Accordingly, unevenness of writing can be reduced, and the size of the rotary polygonal mirror made of plastics can be minimized.

What is claimed is:

1. A laser optical system comprising:

a rotary polygonal mirror made of a plastic material; and an f-θ lens for forming an image on a scanning surface with a laser beam reflected by said rotary polygonal mirror, wherein a surface length $F_w$ (mm) of said rotary polygonal mirror in a rotary direction satisfies the following expression, $$F_W > \left\{ \frac{0.4 \cdot f \cdot \lambda}{(100-D_F) \cdot \pi \cdot \omega_0} + d \cdot \tan\frac{\theta_{max}}{2} \right\} \times \beta + \alpha$$

where $\theta_{max}$ (rad) is a maximum scanning half angle; max $\omega_0$ (μm) is a beam diameter on the scanning surface;

$\lambda$ (nm) is a wavelength of the laser beam;

f (mm) is a focal distance of the f-θ lens;

$D_F$ (%) is an effective scanning efficiency;

$\beta$ is a coefficient wherein $1<\beta<2$;

d (mm) is a diameter of an inscribed circle of said rotary polygonal mirror having a maximum half scanning angle $\theta_{max}$, an overall mirror surface of which is highly accurate; and $\alpha$ (mm) is a size of an unused portion located close to an end of the mirror surface.

2. A laser optical system according to claim 1, wherein $\alpha$ is at least about 3 mm.

3. A laser optical system according to claim 2, wherein $\alpha$ is at least about 6 mm.

* * * * *